(No Model.)
D. C. LOCKWOOD.
MANUFACTURE OF ARTICLES COATED WITH CELLULOID, PYROXYLINE, &c.
No. 251,260. Patented Dec. 20, 1881.
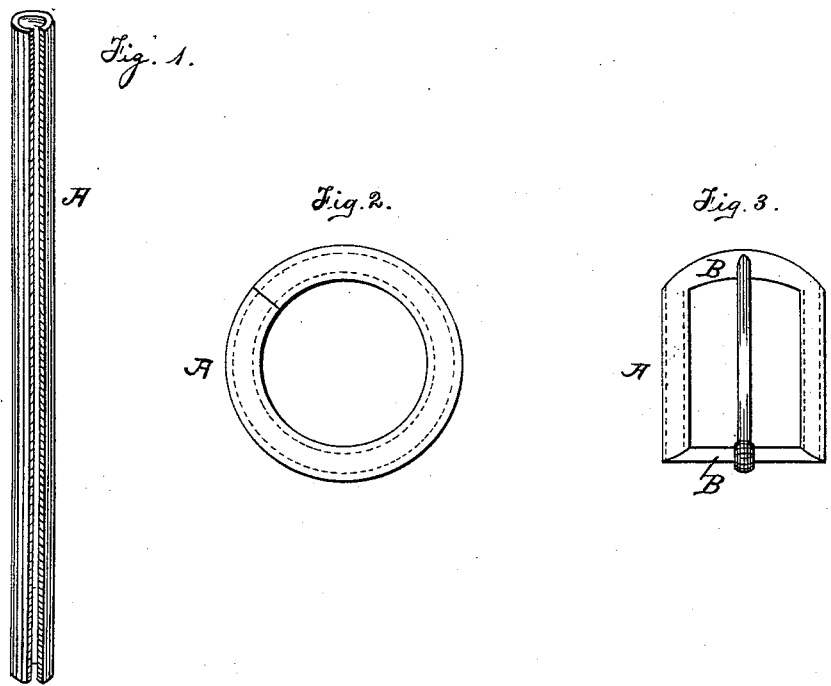
Witnesses:
Chas. C. Gill
Herman Gustow
Inventor,
David C. Lockwood,
By his Attorneys,
Cox & Cox

UNITED STATES PATENT OFFICE.

DAVID C. LOCKWOOD, OF NEWARK, NEW JERSEY, ASSIGNOR TO THE RUBBER AND CELLULOID HARNESS TRIMMING COMPANY, OF SAME PLACE.

MANUFACTURE OF ARTICLES COATED WITH CELLULOID, PYROXYLINE, &c.

SPECIFICATION forming part of Letters Patent No. 251,260, dated December 20, 1881.

Application filed October 13, 1881. (No model.)

*To all whom it may concern:*

Be it known that I, DAVID C. LOCKWOOD, of Newark, in the county of Essex and State of New Jersey, have invented a new and useful Improvement in Manufacture of Articles Coated with Celluloid, Pyroxyline, &c., of which the following is a specification, reference being had to the accompanying drawings.

The invention has relation to the production of endless articles (such as rings, buckles, &c.) which consist of a core covered or coated with plastic material.

In practicing my invention I have heretofore used compounds of pyroxyline, especially that known as "celluloid;" but other plastic materials may be made use of with satisfactory results.

In the production of articles of this class it has been customary to form the article by forcing the plastic material into a die or mold in which a core has been supported by pins, and in other instances the piece of material has been united by means of cement and then finished; but these methods are obnoxious to serious objections by reason of displacements of the core, difficulties in connecting the lap, and other objections, all of which I am able to successfully avoid.

In the accompanying drawings, Figure 1 is a view of a piece of tubing after it has been slit. Fig. 2 is a view showing the application of the tubing in the form of a ring, the article being represented in the condition it is in before it is introduced into the die. Fig. 3 is a view showing the application in the production of a buckle, the material being applied, as indicated, to cover parts or sections of the buckle only, the whole being shown in an unfinished condition, as in Fig. 2.

In my process the plastic material of which the coating is intended to be formed is placed in a stuffing-box of any convenient construction, provided with a core - nozzle, through which the material is forced to form a tube, the interior diameter of the tube corresponding with the diameter of the core to be used in the manufacture of the article, and the outer diameter of the tube being somewhat greater than the thickness of the article after it has been finished. At the mouth of the nozzle is placed, by preference, a knife of suitable size, the edge of which is toward the nozzle, and which serves to slit the material as it is being forced from the stuffing-box; but the slitting of the tubing may be effected by other means, as may be deemed expedient. The tube, being formed, is cut into pieces, and utilized by being applied to encompass the core or any parts thereof. The formation of the tube and the method of slitting it are matters of judgment, and are not in themselves of the essence of the invention. The sections of the tubing, formed and cut as hereinbefore described, are opened by the operator and manipulated to envelop the core according to the circumstances of the case. The tubing is pressed with the fingers sufficiently to be retained in place, and the enveloped core then introduced into a mold of appropriate construction and subjected to heat and pressure, the heat and pressure being such as to solidify the plastic material, and being continued until the piece of tubing is firmly united and an even coating formed. After the article is taken from the press it will be in a substantially finished condition, requiring only to be finally polished to be ready for the market.

In Fig. 2 of the drawings the use of a single piece to cover the whole core is illustrated, and in Fig. 3 the application where only parts or sections are to be covered is shown.

A denotes the tubing, and B the parts of the core or blank which are not intended to be coated.

Concerning the nature of the machine for forming the tube, any stuffing-machine provided with suitable appliances may be used with satisfactory results; or, as hereinbefore stated, the tubing may be made in other ways, if preferred.

The steps described will, by preference, be pursued while the material is in a plastic condition, although it is not essential that the plastic condition should be preserved without interruption during the entire continuance of the process.

I do not claim the use of a stuffing-box for the purpose described; but

What I claim is—

1. The within-described process of forming endless articles, such as rings, buckles, &c., (which consist of a core covered with plastic material,) which consists in forming pieces of tubing of plastic material of a size and diameter adapted to the core to be coated, cutting the same longitudinally, manipulating them to inclose the core, and subjecting the core thus enveloped to heat and pressure in an appropriate die or mold.

2. The process herein described of applying plastic material to endless articles, such as buckles, &c., (which consist of a blank covered in part with a plastic material,) which consists in forming and slitting a section or piece of tubing of plastic substance of appropriate dimensions, applying it to cover the part to be coated, and subjecting the article coated to heat and pressure in an appropriate die.

3. The within-described process of producing endless articles, such as rings, buckles, &c., (which consist of a core enveloped by plastic material,) which consists in forming a piece of tubing of appropriate length and diameter, applying the same to the core, and subjecting the core thus enveloped to pressure in a heated mold of appropriate construction, the whole being done while the material is in a plastic state.

In testimony that I claim the foregoing improvement in manufacture of celluloid, pyroxyline, &c., as above described, I have hereunto set my hand this 7th day of October, 1881.

DAVID C. LOCKWOOD.

Witnesses:
CHAS. C. GILL,
HERMAN GUSTOW.